(12) United States Patent
Pavani et al.

(10) Patent No.: US 9,569,851 B2
(45) Date of Patent: Feb. 14, 2017

(54) SEQUENCING PRODUCTS RECOGNIZED IN A SHELF IMAGE

(71) Applicants: Sri Kaushik Pavani, Chennai (IN); Anshul Garg, Haryana (IN); Bharathi Shekar, Bangalore (IN)

(72) Inventors: Sri Kaushik Pavani, Chennai (IN); Anshul Garg, Haryana (IN); Bharathi Shekar, Bangalore (IN)

(73) Assignee: RICOH CO., LTD., Tokyo (JP)

( * ) Notice: Subject to any disclaimer, the term of this patent is extended or adjusted under 35 U.S.C. 154(b) by 76 days.

(21) Appl. No.: 14/582,030

(22) Filed: Dec. 23, 2014

(65) Prior Publication Data
US 2016/0180533 A1 Jun. 23, 2016

(51) Int. Cl.
*G06T 7/00* (2006.01)
*G06K 9/00* (2006.01)
*G06K 9/32* (2006.01)
*G06Q 10/08* (2012.01)
*G06K 9/46* (2006.01)

(52) U.S. Cl.
CPC ......... *G06T 7/0044* (2013.01); *G06K 9/00624* (2013.01); *G06K 9/3233* (2013.01); *G06K 9/46* (2013.01); *G06Q 10/087* (2013.01); *G06T 2207/20021* (2013.01)

(58) Field of Classification Search
CPC .................... G06T 7/0044; G06T 2207/20021; G06K 9/00624; G06K 9/3223; G06K 9/46; G06Q 10/087
USPC ........................................................ 382/103
See application file for complete search history.

(56) References Cited

U.S. PATENT DOCUMENTS

| 5,542,031 | A | * | 7/1996 | Douglass | ............... | G06K 15/00 358/1.15 |
|---|---|---|---|---|---|---|
| 8,411,109 | B2 | | 4/2013 | Kramer | | |
| 8,761,517 | B2 | | 6/2014 | Ding | | |
| 8,885,916 | B1 | | 11/2014 | Maurer et al. | | |

(Continued)

FOREIGN PATENT DOCUMENTS

| JP | 2013014423 | 1/2013 |
|---|---|---|
| WO | WO 2009027839 | 3/2009 |

OTHER PUBLICATIONS

European Search Report for EP Application No. EP 15 20 0861, dated May 3, 2016, 8 pages.

(Continued)

*Primary Examiner* — Jon Chang
(74) *Attorney, Agent, or Firm* — Patent Law Works LLP

(57) ABSTRACT

A method for sequencing products on a retail shelf, or other objects, recognized in an image of the retail shelf includes detecting products in the received image and calculating a final sequence position for each detected product. The final sequence position is calculated by generating a region of interest for each detected product in the received image, generating a plurality of unique raster numbers for each region of interest using a raster number equation by varying parameters of the raster number equation based on pixel coordinates of each region of interest, determining a plurality of sequence positions for each region of interest using the plurality of unique raster numbers, and determining the final sequence position for each region of interest using the plurality of sequence positions for each region of interest. The disclosure also includes systems for implementing the method.

20 Claims, 6 Drawing Sheets

(56) References Cited

U.S. PATENT DOCUMENTS

| | | | |
|---|---|---|---|
| 9,076,119 | B2 | 7/2015 | Jain et al. |
| 9,330,474 | B1 | 5/2016 | Shekar et al. |
| 9,342,900 | B1 | 5/2016 | Shekar et al. |
| 2003/0036985 | A1* | 2/2003 | Soderholm ........ G06K 17/0022 705/28 |
| 2008/0101784 | A1 | 5/2008 | Hsu |
| 2008/0187241 | A1 | 8/2008 | Talati |
| 2008/0253656 | A1* | 10/2008 | Schwartzberg ...... G06K 9/3258 382/181 |
| 2010/0226532 | A1 | 9/2010 | Hayasaka et al. |
| 2013/0058560 | A1 | 3/2013 | Sobczak |
| 2013/0134178 | A1* | 5/2013 | Lu ........................... G07F 9/026 221/1 |
| 2014/0003729 | A1 | 1/2014 | Auclair et al. |
| 2014/0314276 | A1 | 10/2014 | Wexler et al. |
| 2015/0178565 | A1 | 6/2015 | Rivlin |
| 2015/0242694 | A1 | 8/2015 | Miyagawa |
| 2015/0248578 | A1 | 9/2015 | Utsumi |

OTHER PUBLICATIONS

Halcon "Solution Guide III-B 2D Measuring", dated May 1, 2012, retrieved from the Internet: http://www9.cs.tum.edu/praktika/ppbv.WS02/doc/pdf/solution_guide/solution_guide_iii_b_2d_measuring.pdf [retrieved on Apr. 25, 3016], 90 pages, MVTec Software GmbH, Munchen, Germany.

Anonymous "Camera Calibration with OpenCV", dated Oct. 27, 2014, retrieved from internet: https://web.archive.org/web/20141027064631/http://docs.opencv.org/2.4/doc/tutorials/calib3d/camera_calibration/camera_calibration.html [retrieved on Apr. 25, 2016], 9 pages, Internet Archive—WayBackMachine.

European Search Report for EP Application No. EP 15 19 9771, dated May 17, 2016, 7 pages.

Non-Final Office Action for U.S. Appl. No. 14/582,046, dated Aug. 11, 2016, 7 pages.

* cited by examiner

SEQUENCING PRODUCTS RECOGNIZED IN A SHELF IMAGE

BACKGROUND

1. Field of the Art

The present specification generally relates to the field of object detection in image processing. More specifically, the present specification relates to a system and method for generating a sequence position for products recognized in an image of a retail shelf.

2. Description of the Related Art

In many instances it is valuable to use image recognition technology to recognize multiple objects captured over multiple images. For example, in a retail environment it is useful to know what the state of products is on the shelves or displays. For example, knowing whether products are stocked in the correct location or whether a product is out of stock. However, because of consumer activity products can be out of stock or moved to incorrect locations on the shelves or displays. While a human can move products to their correct locations, it is time consuming to record the position of all products. Therefore it is useful to automatically or semi-automatically obtain information about the state of products on the shelves or displays. One method for obtaining information about the state of products on shelves or displays is to use image recognition technology.

Existing public and/or proprietary image recognition algorithms do not arrange detection results in a logical order. The random order makes interpreting data or debugging a false image recognition results a difficult task, especially when the number of products identified in each image is in the order of hundreds.

SUMMARY

The techniques introduced herein overcome the deficiencies and limitations of the prior art, at least in part, with an approach to sequence the regions of interest in a received image in a zig-zag fashion from top-left to bottom-right.

The techniques include an image recognition system to receive an image including a plurality of objects and detect objects in the received image. The image recognition system includes a raster number engine to generate a plurality of raster numbers for each detected object in the received image and a sequencing engine to generate a plurality of sequence positions for each detected object in the received image and output a final sequence position for each object.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques described herein are illustrated by way of example, and not by way of limitation, in the figures of the accompanying drawings in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Figure 1:
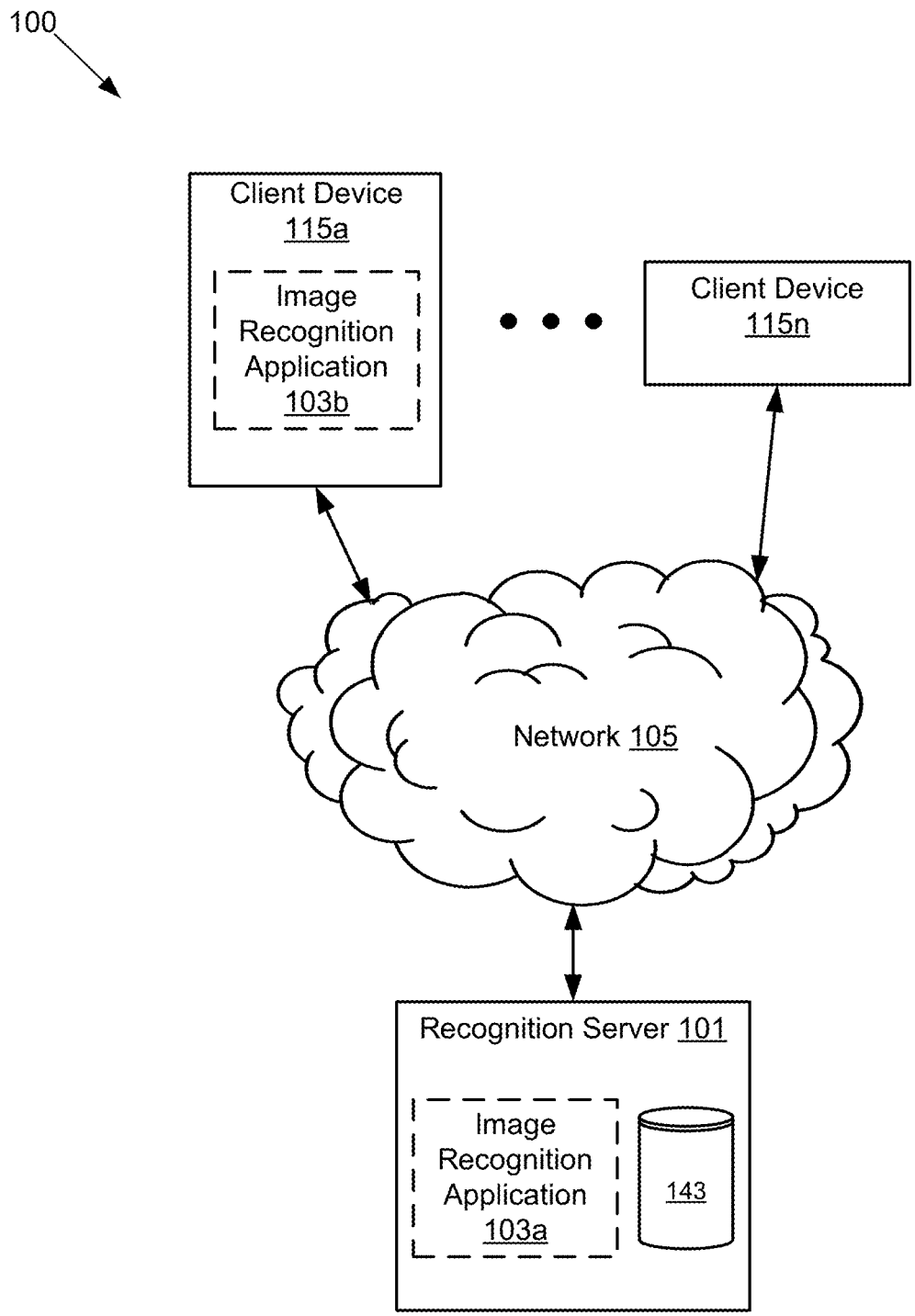
FIG. 1 is a high-level block diagram illustrating one example embodiment of a system for sequencing objects recognized in an image.

FIG. 1 is a high-level block diagram illustrating one example embodiment of a system 100 for sequencing objects recognized in an image. The illustrated system 100 includes client devices 115a . . . 115n that can be accessed by users and a recognition server 101. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data, including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. The recognition server 101 may be a computing device including a processor, a memory, network communication capabilities, and data storage (e.g., data storage 143). In the example of FIG. 1, the components of the recognition server 101 are configured to implement an image recognition application 103a described in more detail below. In some embodiments, the recognition server 101 sends and receives data to and from other entities of the system 100 via the network 105. For example, the recognition server 101 sends and receives data including images of objects, raster numbers calculated for each object and a sequence position associated with each object to and from the client device 115. The images of objects received by the recognition server 101 can include an image captured by the client device 115, an image copied from a website or an email, or an image from any other source. While the example of FIG. 1 includes one recognition server 101, the system 100 may include one or more recognition servers 101.

The data storage 143 is a non-transitory memory that stores data for providing the functionality described herein. The data storage 143 may be a dynamic random access memory (DRAM) device, a static random access memory (SRAM) device, flash memory or some other memory devices. In some embodiments, the data storage 143 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In one embodiment, the data storage 143 stores the images received by the recognition server 101 and data associated with the images. For example, data storage 143 may store image detection results including regions of interest related to objects in the image, a plurality of raster numbers associated with each region of interest for sequencing the detected objects in the image, and/or a sequence position associated with each object. The data storage 143 may also be configured to store a final sequence position associated with each object in the image. While the example of FIG. 1 includes a single data storage 143 as part of the recognition server 101, it should be understood that data storage may be located elsewhere in the system 100. For example, a discrete storage device may be coupled with the recognition server 101, via a local connection or over the network 105. Similarly, in one embodiment, client device 115 may include an image recognition application 103b and a data storage (not shown) as described in more detail below.

The client devices 115a ... 115n depicted in FIG. 1 are used by way of example. In some embodiments, the client devices 115a ... 115n may each be a computing device that includes a memory, a processor and a camera, for example a laptop computer, a desktop computer, a tablet computer, a mobile telephone, a personal digital assistant (PDA), a mobile email device, a webcam or any other electronic device capable of accessing a network 105. The client device 115 includes a display for viewing information provided by the recognition server 101. While FIG. 1 illustrates two client devices 115a and 115n, the disclosure applies to a system architecture having one or more client devices 115.

In one embodiment, the image recognition application 103 includes software and/or logic to detect and identify objects in an image of one or more objects and sequence the objects in a logical order. In some embodiments, the image recognition application 103 can be implemented using programmable or specialized hardware, such as a field-programmable gate array (FPGA) or an application-specific integrated circuit (ASIC). In some other embodiments, the image recognition application 103 can be implemented using a combination of hardware and software. In some embodiments, the image recognition application 103 may be stored and executed by a combination of the client devices 115 and the recognition server 101, or by any one of the client devices 115 or recognition server 101.

In some embodiments, a client device 115 may be configured to run all or part of the image recognition application 103. For example, in one embodiment, the image recognition application 103b acts as a thin-client application with some functionality executed on the client device 115 and additional functionality executed on the recognition server 101 by recognition application 103a. For example, the image recognition application 103b on the client device 115a could include software or routines for capturing one or more images of products on a retail shelf or display, transmitting the images to the recognition server 101, and displaying image recognition results. A thin-client application 103b may include other functionality described below with reference to recognition application 103, for example, object detection, identification, and/or sequencing.

In one embodiment, the image recognition application 103 is configured to detect and identify objects in an image. For example, the image recognition application 103b sends a query image to the image recognition application 103a on the recognition server 101. The image recognition application 103 may use conventional public or proprietary methods for detecting objects in the image and identifying the objects. The image recognition application 103a on recognition server 101 may provide data in JSON (JavaScript Object Notation) format about one or more objects recognized in the query image to the client device 115a. For example, the data may include an object ID associated with each recognized object in the image (e.g., the object ID may be based on an identification result), a region of interest for each identified product in the image, region of interest coordinates (e.g., a location of a pixel corresponding to a corner, a center point, and/or any other point in the region of interest), and an overall image width (in pixels).

In one embodiment, the image recognition application 103 receives one or more images of products on retail shelves or displays and sequences the products in the images. To sequence the products in the one or more images, the image recognition application generates a plurality of raster numbers for each product in the one or more images and uses the raster numbers to determine a final sequence position. The sequencing process is described in more detail below.

Figure 2:
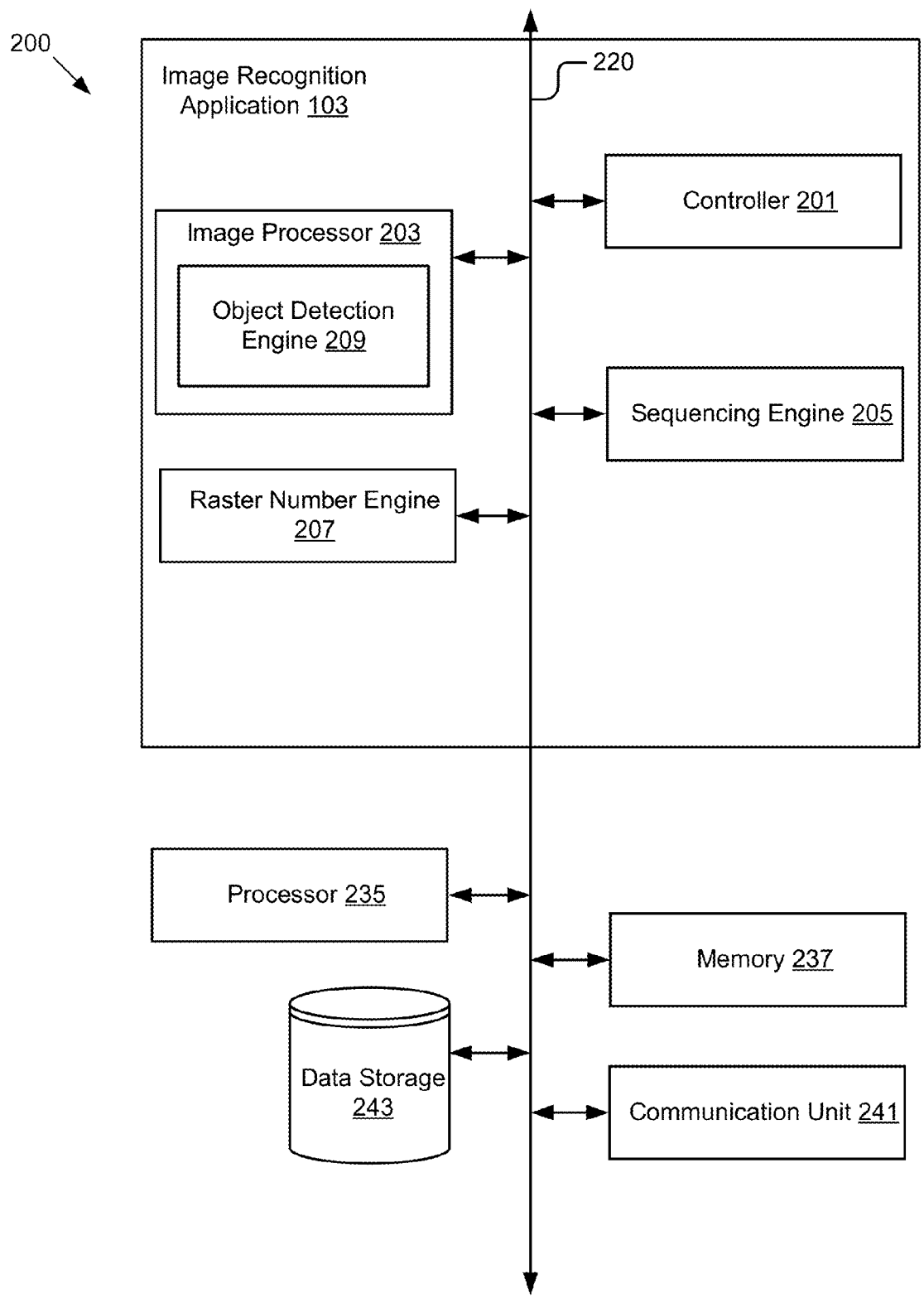
FIG. 2 illustrates a block diagram of an example image sequencing system including an image recognition application.

FIG. 2 illustrates a block diagram of an example image sequencing system 200 including an image recognition application 103. For example, the image sequencing system 200 may be a client device 115, a recognition server 101, or a combination of a client device 115 and a recognition server 101, as described above. In the example of FIG. 2, the image sequencing system 200 includes an image recognition application 103, a processor 235, a memory 237, a communication unit 241, and data storage 243. The image recognition application 103 includes a controller 201, an image processor 203, a raster number engine 207, and a sequencing engine 205. In one embodiment, a bus 220 communicatively couples the components of the image sequencing system 200. The bus 220 may represent one or more buses including an industry standard architecture (ISA) bus, a peripheral component interconnect (PCI) bus, a universal serial bus (USB), or some other bus known in the art to provide similar functionality.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, a Graphics Processing Unit (GPU), and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the image sequencing system 200 including, for example, the controller 201, the image processor 203, the raster number engine 207, the sequencing engine 205, the memory 237, the communication unit 241, and the data storage 243. It will be apparent that other processors, sensors, displays and physical configurations are possible.

The memory 237 may store and provide access to data for the other components of the image sequencing system 200. The memory 237 may be included in a single computing device or a plurality of computing devices as discussed elsewhere herein. In some implementations, the memory 237 may store instructions and/or data that may be executed by the processor 235. For example, in one embodiment, the memory 237 may store instructions, which when executed by the processor, causes the processor to implement the image recognition application 103, including the controller 201, the image processor 203, the raster number engine 207, and the sequencing engine 205. The memory 237 may also be capable of storing other instructions and data, including, for example, an operating system, hardware drivers, other software applications, databases, etc. The memory 237 may be coupled to the bus 220 for communication with the processor 235 and the other components of the image sequencing system 200.

The memory 237 may include one or more non-transitory computer-usable (e.g., readable, writeable, etc.) mediums, which can be any tangible apparatus or device that can contain or store instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk, an optical disk (CD, DVD, Blue-Ray™, etc.). It should be understood that the memory 237 may be a single device or may include multiple types of devices and configurations.

The communication unit 241 is hardware for receiving and transmitting data by coupling the processor 235 and other components of the image sequencing system 200 to the network 105 and other processing systems. The communication unit 241 is configured, for example, to receive the one or more images from the client device 115 and/or transmit detected objects and/or a sequence position for objects in the images. In one embodiment, the communication unit 241 may include a port for direct physical connection to the network 105 or to another communication channel. For example, the communication unit 241 may include an RJ45 port or similar port for wired communication with the network 105. In another embodiment, the communication unit 241 may include a wireless transceiver (not shown) for exchanging data via the network 105 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP.

The data storage 243 is a non-transitory memory that stores data for use in providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk, a floppy disk, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. In one embodiment, the data storage 243 stores one or more images received from the client device 115 and data associated with the one or more images. For example, data storage 243 may store image detection results including regions of interest (e.g., object-bounding boxes) for each object detected in the images, raster numbers for each object, and/or a sequence position of each object. The data storage 243 may also be configured to store a final sequence position of each object in the images. The data stored in data storage 243 is described in more detail below.

The controller 201 includes software and/or logic for handling communications between the image processor 203, sequencing engine 205, raster number engine 207 and other components of the image sequencing system 200. In one embodiment, the controller 201 can be a set of instructions executable by the processor 235 to coordinate communication between the image processor 203, the sequencing engine 205 and the raster number engine, as well as other components of the image sequencing system 200. In another embodiment, the controller 201 can be instructions stored in the memory 237 of the image sequencing system 200 and can be accessible and executable by the processor 235. In either embodiment, the controller 202 can be adapted for cooperation and communication with the processor 235 and other components of the image sequencing system 200 via bus 220.

The image processor 203 includes an object detection engine 209. The object detection engine 209 includes software and/or logic to detect and identify objects in an image. While a product in an image of a retail shelf or display is used throughout the specification as an example of an object, objects may be other recognizable features in an image of any environment, for example, faces, documents, books, or the like. The object detection engine 209 may detect and identify objects in an image according to existing public and/or proprietary image recognition algorithms. In some embodiments, the object detection engine 209 may be implemented using programmable or specialized hardware including a field programmable gate array (FPGA) or an application-specific integrated circuit (ASIC). In some embodiments, the object detection engine 209 may be implemented using a combination of hardware and software executable by processor 235. In some embodiments, the object detection engine 209 is a set of instructions executable by the processor 235. In some implementations, the object detection engine 209 is instructions stored in the memory 237 and is accessible and executable by the processor 235. In some implementations, the object detection engine 209 is adapted for cooperation and communication with the processor 235, the memory 237 and other components of the image recognition application 103 via the bus 220.

Although the image recognition application 103 depicted in the example of FIG. 2 includes a single image processor 203, it should be recognized that one or more additional image processors may be used for product detection and identification. Likewise, as described elsewhere herein, the image processor 203 may process individual images serially or in parallel. Additionally, the image processor 203 may stitch multiple images received from the client device 115 into a single image for processing. In various embodiments, the image processor 203 outputs image detection results including an object ID, a region of interest (e.g., a bounding box) for each identified product in the image, coordinates of the region of interest, and an overall image width (in pixels). The output may be used to provide a final sequence position for the identified objects in the one or more received images as described in more detail below. In some embodiments, the image processor 203 may begin performing detection on images received from client device 115a while the client device 115a is still capturing images to be used in creating the final sequence position.

The sequencing engine 205 may include software and/or logic to create a plurality of sequence positions for each detected object in the images received from the client device 115. In some embodiments, the sequencing engine 205 may be implemented using programmable or specialized hardware including a field-programmable gate array (FPGA) or an application-specific integrated circuit (ASIC). In some embodiments, sequencing engine 205 may be implemented using a combination of hardware and software executable by processor 235. In other embodiments, the sequencing engine 205 is a set of instructions executable by the processor 235. In some implementations, the sequencing engine 205 is instructions stored in the memory 237 and is accessible and executable by the processor 235. In some implementations, the sequencing engine 205 is adapted for cooperation and communication with the processor 235, the memory 237 and other components of the image sequencing system 200 via the bus 220.

The raster number engine 207 may include software and/or logic to create a plurality of raster numbers for each detected object in the one or more images using a raster number equation as described below. In some embodiments, the raster number engine 207 may be implemented using programmable or specialized hardware including a field-programmable gate array (FPGA) or an application-specific integrated circuit (ASIC). In other embodiments, the raster number engine 207 may be implemented using a combination of hardware and software executable by processor 235. In some embodiments, the raster number engine 207 is a set of instructions executable by the processor 235. In some implementations, the raster number engine 207 is instructions stored in the memory 237 and is accessible and executable by the processor 235. In some implementations, the raster number engine 207 is adapted for cooperation and communication with the processor 235, the memory 237 and other components of the image sequencing system 200 via the bus 220. The function of the raster number engine 207 and the sequencing engine 205 are described in more detail below with reference to FIGS. 7 and 8.

Figure 3:
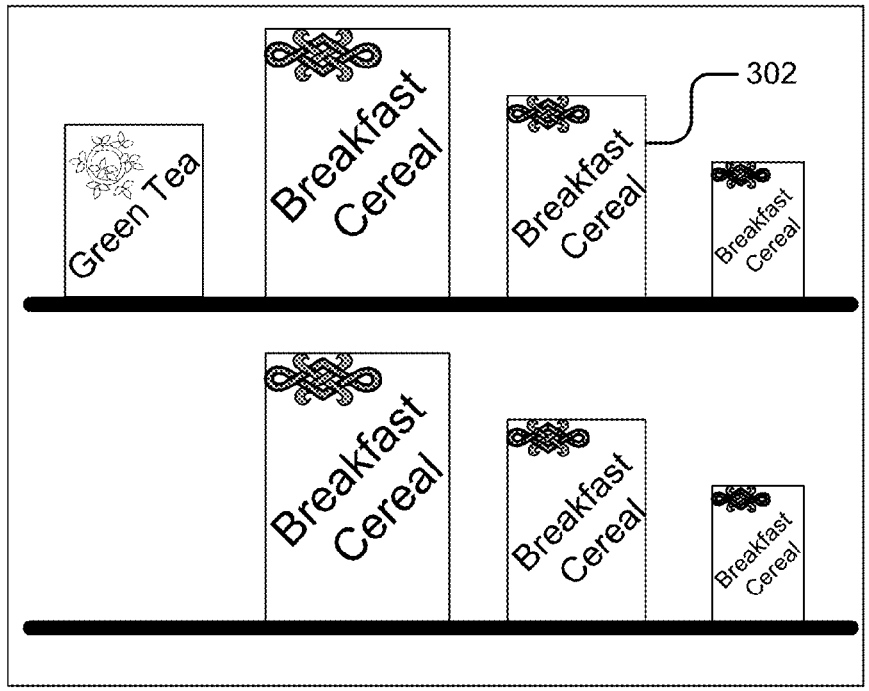
FIG. 3 illustrates an example image of products on a store shelf.

FIG. 3 illustrates an example image of products on a store shelf. In the example of FIG. 3, the products in the image include multiple boxes of breakfast cereal (including the box 302) and a box of green tea. However, it should be recognized that an image can include any number, size, and variation of products (or other objects) to be recognized and sequenced by the image recognition application 103. In some embodiments, an auditor/sales force representative may capture the image using a client device 115 (e.g., a laptop computer, a desktop computer, a tablet computer, a mobile telephone, a personal digital assistant (PDA), a mobile email device, a webcam, or the like). In one embodiment, the auditor/sales force representative captures multiple images of a large shelf at a retail store and each image may cover a portion of the shelf. In some embodiments, an image may be copied from a website, an email, or any other source.

Figure 4:
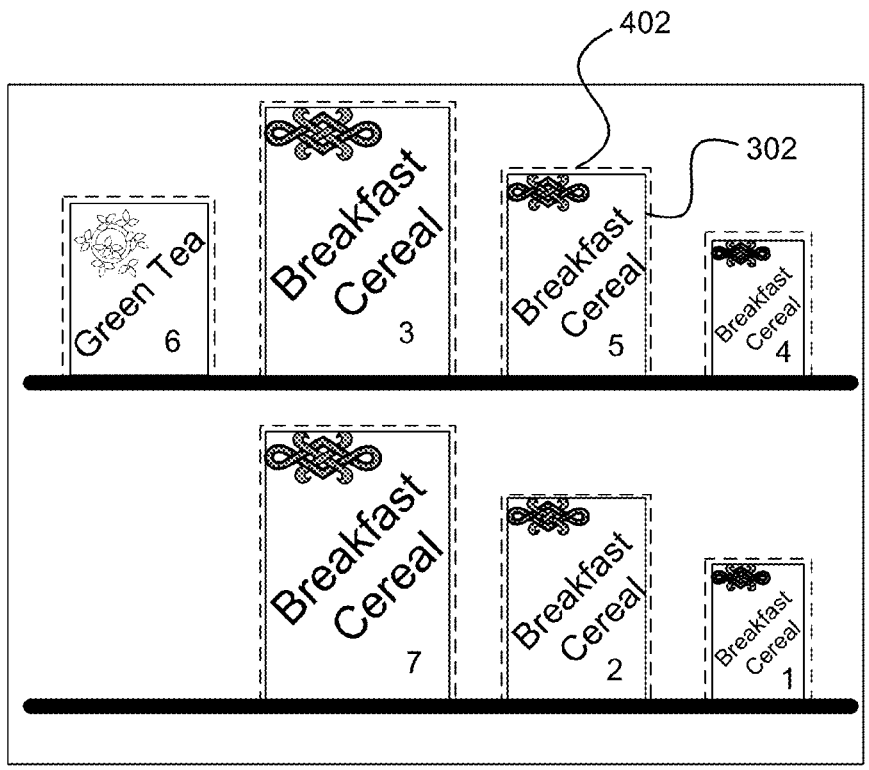
FIG. 4 illustrates an example of randomly numbered regions of interest in an image.

FIG. 4 illustrates an example of randomly numbered regions of interest in an image. As depicted in the example of FIG. 4, the breakfast cereal box 302 has a corresponding region of interest 402. In one embodiment, a region of interest may be defined by a polygon, such as a box, that surrounds the perimeter of a corresponding object in the image (e.g., as depicted by region of interest 402). In other embodiments, the region of interest may be defined by a polygon that surrounds a label of an object, a polygon associated with any part of an object, or any other known method of bounding points of interest associated with an object in an image.

The region of interest 402 in the example of FIG. 4 is numbered as object 5. In some embodiments, the initial number for each region of interest in the image may be in a random sequence. For example, the numbers on the regions of interest in the example of FIG. 4 may denote an order in which objects in the image were recognized, a rank of the objects based on the confidence of the image processor 203 in identifying the object (e.g., the highest rank of "1" is a best identifying match, a second highest rank of "2" is a second best identifying match, etc.), or the like. In one embodiment, the region of interest for each product may be generated by the object detection engine 209.

Figure 5:
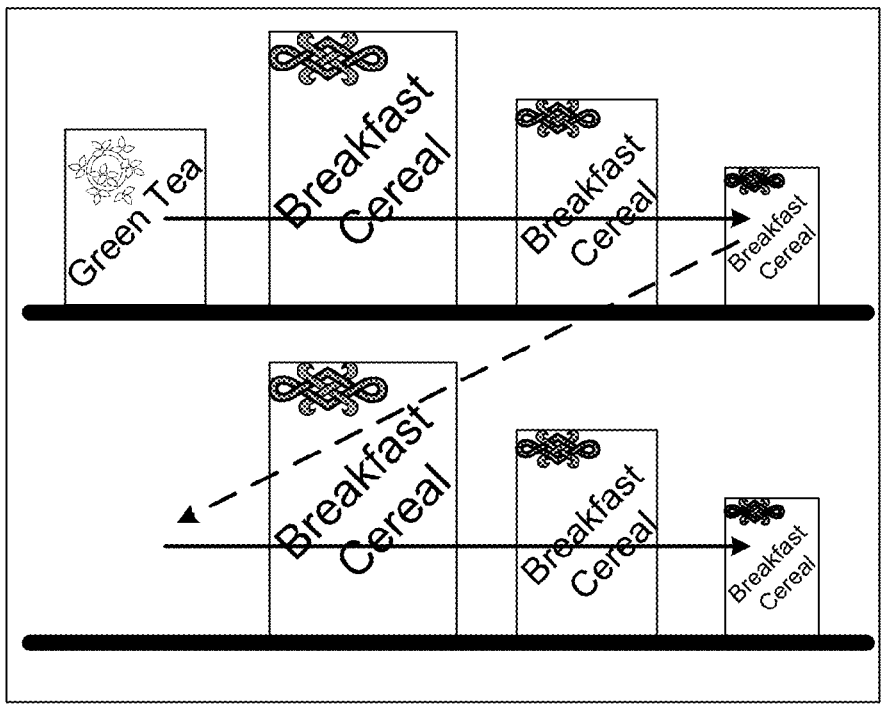
FIG. 5 illustrates an example sequencing order for products in an image.

FIG. 5 illustrates an example sequencing position for products in an image. The sequencing engine 205 is configured to sequence the detected objects in an image in an order that is logical for a human looking at the image recognition results to decipher. For example, in one embodiment, the sequencing engine 205 determines a final sequence position for each region of interest in the image such that the regions of interest are ordered in a zig-zag fashion. In some embodiments, the regions of interest may be ordered from the top-left corner of the image to the bottom-right corner of the image, from the bottom-right corner to the top-left corner or in any other logical order.

Figure 6:
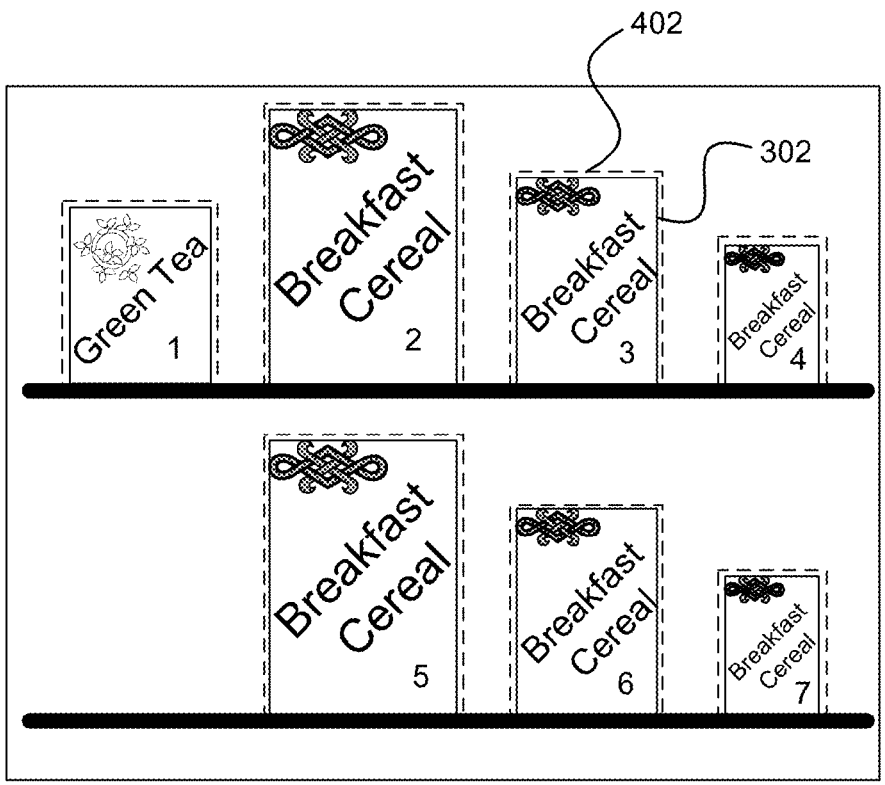
FIG. 6 illustrates an example of sequenced regions of interest for each product in an image.

FIG. 6 illustrates an example of sequenced regions of interest for each product in an image. As described above, the sequencing engine 205 determines a sequence position for each region of interest in an image. The image recognition application 103 may present the final sequence position of each region of interest to the user so that the user can easily determine where a recognized object can be found in the image. In one embodiment, the image recognition application 103 may present a table of objects and their respective sequence positions to the user. In another embodiment, the image recognition application may present the sequence position of a region of interest on the image. For example, the final sequence positions may be overlaid within the region of interest (e.g., bounding box 402) for each object, above the region of interest for each object, or elsewhere in the image with an indication of which object sequence position corresponds to (e.g., by using a callout, or the like).

Figure 7:
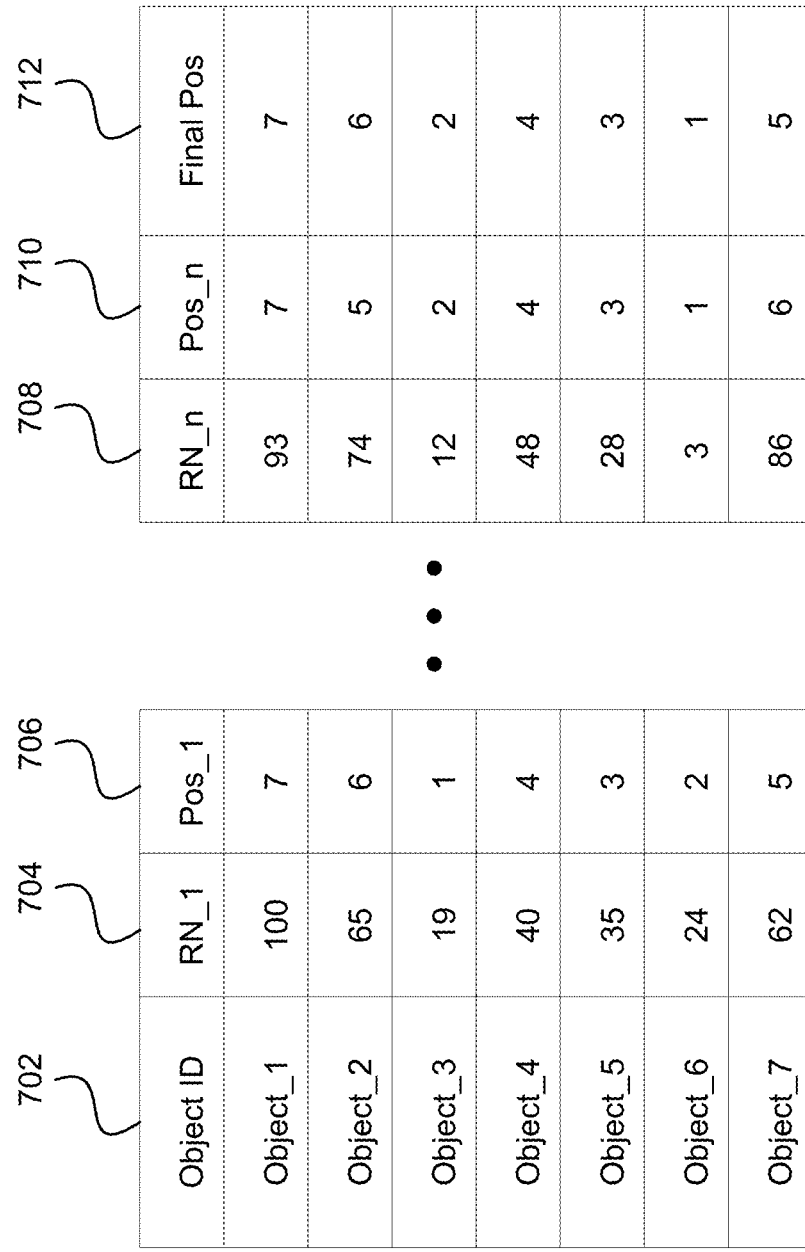
FIG. 7 is an example table including raster numbers and corresponding sequence positions for detected objects in an image.

FIG. 7 is an example table including raster numbers and corresponding sequence positions for detected objects in an image. The table may be stored, for example, in data storage 143 or 243. The table may include Object IDs, sequence positions, and other identifying information for the objects detected in the image. For example, if the objects are products on a store shelf or display, the table may include product names, product descriptions, and other information determined by the recognition application 103. In the example of FIG. 7, column 702 includes the object ID of each object identified in the image. The image recognition application 103 may generate a plurality of raster numbers for each object identified in the image and a sequence position associated with each raster number and store their values in the table. For example, columns 704, 706, 708, and 710 in the example table of FIG. 7 include raster numbers and sequence positions associated with each object detected in the image. Additionally, column 712 includes the final sequence position calculated by the sequencing engine 205 for each object identified in the image. The calculation of the final sequence position is described in more detail below with reference to FIG. 8.

Figure 8:
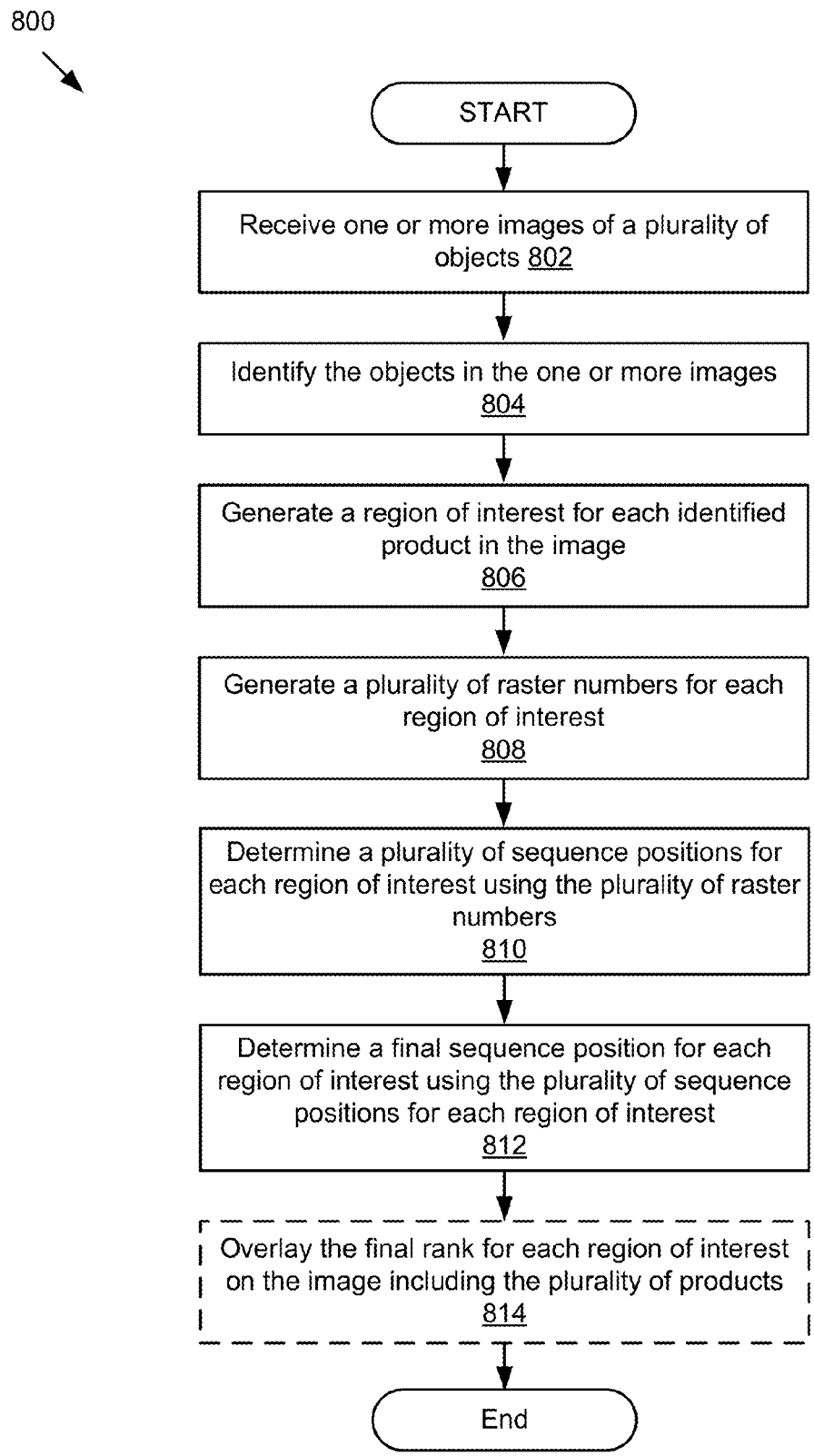
FIG. 8 is a flow diagram of an example method for sequencing detected objects in an image.

FIG. 8 is a flow diagram of an example method for sequencing objects detected in one or more images. One advantage of using the techniques disclosed herein to sequence the objects detected in one or more images is that objects (e.g., products on a retail shelf) can be recognized and listed in sequential order quickly, automatically, and accurately, all of which increases the efficiency of audits of shelves. Additionally, objects recognized in a sequenced order can be used to recognize voids on a retail shelf when compared to a planogram of the retail shelf. Moreover, the techniques described herein allow for sequencing of objects of any shape, size or located at random orientations. The results can then be used, for example, to rearrange and/or restock products on retail shelves. Properly arranged and restocked products ensure the products are available to the customers for purchase and reduces the risk a customer might switch brand loyalties, thereby increasing sales of the products.

At 802, the image recognition application 103 may receive one or more images of a plurality of objects (e.g., products on a store shelf or display). For example, the image recognition application may receive one or more images captured by a user of client device 115. The image processor 203 may process individual images serially or in parallel. Additionally, the image processor 203 may stitch multiple images received from the client device 115 into a single image for processing.

At 804, the image processor 203 may identify the products in the one or more images. For example, the image processor 203 includes an object detection engine 209 that detects objects in the one or more images. The object detection engine 209 may use known public or proprietary object detection algorithms to detect the plurality of objects in the one or more images. In some embodiments, the image processor 203 processes the detected objects according to known public or proprietary image recognition techniques to identify each of the plurality of objects in the one or more images. In some embodiments, the image processor 203 may process one or more images serially or in parallel and output a corresponding recognition result for each object in the one or more images. Each recognition result may include a description of the identified object from the one or more images. The recognition results may be output in a variety of formats including, for example, JavaScript Object Notation (JSON), Extensible Markup Language (XML), or the like. In the example of products on a store shelf, the recognition result for each product may include, for example, a label image, an object ID (e.g., a stock keeping unit (SKU)), and coordinates of a region of interest corresponding to the object in the one or more images. The recognition results for each identified object may also include other information including a confidence of the image processor 203 in identifying the product.

At 806, the image processor 203 generates a region of interest for each identified object in the original image. In some embodiments, the region of interest may be a bounding box for each identified object in the one or more images. In one embodiment, the image processor 203 generates the region of interest for each identified object during the object recognition process.

At 808, the raster number engine 207 generates a plurality of raster numbers for each region of interest in the one or more images. The identified objects could be ordered based on their respective raster numbers. In some embodiments, raster numbers may be generated using any known public or proprietary raster number equation. However, if certain assumptions (e.g., each object is of the same size and orientation and are stacked linearly) are not met, the raster numbers for each object may lead to an ordering that is not logical to a human. In one embodiment, the raster number equation may include a normalization factor to negate the need for the assumptions to be met. For example, the raster number equation may be, $$RN = \text{floor}\left(\frac{r-1}{N}\right) * nC + c$$

where, r and c denote the row and column number of a pixel in the region of interest, nC denotes the total number of pixel columns in the image and N denotes the normalization factor.

The plurality of raster numbers may be generated using varying parameters of the raster number equation for each region of interest. For example, one of the parameters that may be varied is the row and column numbers (r and c) of a pixel within the region of interest. In one embodiment, r and c may be a row and column number of a pixel corresponding to a center of the region of interest. In some other embodiments, r and c may be a row and column number of a pixel corresponding to a top-left corner of the region of interest, top-right corner of the region of interest, bottom-left corner of the region of interest, bottom-right corner of the region of interest, or any other point within a region of interest. Each set of parameters generates a unique raster number for a particular region of interest.

The normalization factor is introduced to the raster number equation to increase the robustness of the raster number equation in calculating a plurality of raster numbers for each region of interest. In one embodiment, the normalization factor may be the height of a region of interest if all regions of interests are of the same size. In some other embodiments, the normalization factor may be an average height of the plurality of regions of interest, an average length of diagonal of the plurality of regions of interest, an average width of the plurality of regions of interest, or an average of any other dimension of the plurality of regions of interest. In one embodiment, the normalization factor may be any multiple of the average height of the plurality of regions of interest. For example, the normalization factor may be twice the value of the average height of the plurality regions of interest in the original image, half the value of the average height, or any other multiple.

The values of the parameters r, c, and N may be chosen to increase the likelihood that the final sequence position of a region of interest will be in a logical order. In one embodiment, to achieve this result, the values of r, c, and N are chosen such that for each combination of r, c, and N, the raster numbers generated for the regions of interest are unique and the accuracy of ordering is greater than fifty percent.

At 810, the sequencing engine 205 determines a plurality of sequence positions for each region of interest using the plurality of raster numbers. In one embodiment, the sequencing engine 205 determines a plurality of sequence positions for each region of interest based on the output of the raster number engine using varying parameters of the region of interest and a varying normalization factor. In one embodiment, to determine the sequence position for regions of interest in one or more images, the sequencing engine 205 may order the regions of interest according to a raster number value calculated for each region of interest using like parameters (e.g., a center point of each region of interest for r and c, and an average height of the regions of interest for N). For example, in an image including n regions of interest, the sequencing engine 205 determines that a region of interest with the lowest raster number is given the sequence position 1 and the region of interest with highest raster number is given the sequence position n. It will be apparent that the sequencing engine 205 may use the raster numbers to order the regions of interest in other ways.

At 812, the sequencing engine 205 determines a final sequence position for each region of interest using the plurality of sequence positions for each region of interest. In one embodiment, the sequencing engine 205 determines the final sequence position for a region of interest by calculating a mean, median, mode, etc., of the plurality of sequence positions for the region of interest.

The number of sequence positions used to generate a final sequence position for a region of interest in an image including a plurality of products varies from one embodiment to another. In one embodiment, a minimum of 100 sequence positions may generate a reliable final sequence position. In another embodiment, the minimum number of sequence positions to generate a reliable final sequence position may be 1500. In yet another embodiment, the number of sequence positions for each product to generate a reliable final sequence position may be the no less than the number of products.

The final sequence position for each region of interest orders the plurality of objects detected in the image in a zig-zag fashion as shown in FIG. 5. In one embodiment, the plurality of objects may be ordered from the top-left corner of the image to the bottom-right corner of the image. In another embodiment, the plurality of products may be ordered from the bottom-right corner to the top-left corner of the image or in any other logical order.

At 814, the image recognition application 103 may optionally present the final sequence position to the user on the image. For example, the final sequence positions may be overlaid within the region of interest (e.g., bounding box 402) for each object, above the region of interest for each object, or elsewhere in the image with an indication of which object sequence position corresponds to (e.g., by using a callout, or the like).

A system and method for sequencing objects recognized in one or more images has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A method comprising:
receiving an image of a plurality of objects;
detecting objects in the received image;
generating a region of interest for each detected object in the received image;
generating a plurality of unique raster numbers for each region of interest using a raster number equation by varying parameters of the raster number equation based on pixel coordinates of each region of interest;
determining a plurality of sequence positions for each region of interest using the plurality of unique raster numbers; and
determining a final sequence position for each region of interest using the plurality of sequence positions for each region of interest.

2. The method of claim 1, wherein the raster number equation includes a normalization factor.

3. The method of claim 1, wherein the parameters of the raster number equation are selected from the group consisting of: a row and column number of a pixel corresponding to a center of the region of interest; a row and column number of a pixel corresponding to a left-top of the region of interest; a row and column number of a pixel corresponding to a right-top of the region of interest; a row and column number of a pixel corresponding to a left-bottom of the region of interest; and a row and column number of a pixel corresponding to a right-bottom of the region of interest.

4. The method of claim 2, wherein the normalization factor comprises an average height of the regions of interest, an average length of diagonal of the regions of interest, or an average width of the regions of interest.

5. The method of claim 1, wherein determining a final sequence position for each region of interest comprises calculating one of a mean, median, or mode of the plurality of sequence positions for each region of interest.

6. The method of claim 1, further comprising presenting the image for display with the final sequence position for each region of interest indicated in the image.

7. The method of claim 1, wherein the final sequence position for each region of interest orders the plurality of objects in the image in a zig-zag fashion from a top-left corner of the image to a bottom-right corner of the image.

8. A computer program product comprising a non-transitory computer usable medium including a computer readable program, wherein the computer readable program when executed on a computer causes the computer to:
receive an image of a plurality of objects;
detect objects in the received image;
generate a region of interest for each detected object in the received image;

generate a plurality of unique raster numbers for each region of interest using a raster number equation by varying parameters of the raster number equation based on pixel coordinates of each region of interest;

determine a plurality of sequence positions for each region of interest using the plurality of unique raster numbers; and determine a final sequence position for each region of interest using the plurality of sequence positions for each region of interest.

9. The computer program product of claim 8, wherein the raster number equation includes a normalization factor.

10. The computer program product of claim 8, wherein the parameters of the raster number equation are selected from the group consisting of: a row and column number of a pixel corresponding to a center of the region of interest; a row and column number of a pixel corresponding to a left-top of the region of interest; a row and column number of a pixel corresponding to a right-top of the region of interest; a row and column number of a pixel corresponding to a left-bottom of the region of interest; and a row and column number of a pixel corresponding to a right-bottom of the region of interest.

11. The computer program product of claim 9, wherein the normalization factor comprises an average height of the regions of interest, an average length of diagonal of the regions of interest, or an average width of the regions of interest.

12. The computer program product of claim 8, wherein to determine a final sequence position for each region of interest the computer readable program causes the computer to calculate one of a mean, median, or mode of the plurality of sequence positions for each region of interest.

13. The computer program product of claim 8, wherein the computer readable program causes the computer to present the image for display with the final sequence position for each region of interest indicated in the image.

14. The computer program product of claim 8, wherein the final sequence position for each region of interest orders the plurality of objects in the image in a zig-zag fashion from a top-left corner of the image to a bottom-right corner of the image.

15. A system comprising:
a communication unit configured to receive an image of a plurality of objects;
an object detection engine to:
  detect objects in a received image; and
  generate a region of interest for each detected object in the received image;
a raster number engine to generate a plurality of unique raster numbers for each region of interest by varying parameters of a raster number equation based on pixel coordinates of each region of interest;
a sequencing engine to:
  determine a plurality of sequence positions for each region of interest using the plurality of unique raster numbers; and
  determine a final sequence position for each region of interest using the plurality of sequence positions for each region of interest.

16. The system of claim 15, wherein the raster number equation includes a normalization factor.

17. The system of claim 15, wherein the parameters of the raster number equation are selected from the group consisting of: a row and column number of a pixel corresponding to a center of the region of interest; a row and column number of a pixel corresponding to a left-top of the region of interest; a row and column number of a pixel corresponding to a right-top of the region of interest; a row and column number of a pixel corresponding to a left-bottom of the region of interest; and a row and column number of a pixel corresponding to a right-bottom of the region of interest.

18. The system of claim 16, wherein the normalization factor comprises an average height of the regions of interest, an average length of diagonal of the regions of interest, or an average width of the regions of interest.

19. The system of claim 15, wherein, to determine the final sequence position, the sequencing engine calculates one of a mean, median, or mode of the plurality of sequence positions for each region of interest.

20. The system of claim 15, wherein the final sequence position for each region of interest orders the plurality of objects in the image in a zig-zag fashion from a top-left corner of the image to a bottom-right corner of the image.

* * * * *